US011375575B2

(12) United States Patent
Liu (10) Patent No.: US 11,375,575 B2
(45) Date of Patent: Jun. 28, 2022

(54) APPARATUS AND METHOD OF PERFORMING A GROUP COMMUNICATION

(71) Applicant: GUANGDONG OPPO MOBILE TELECOMMUNICATIONS CORP., LTD., Dongguan (CN)

(72) Inventor: Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/225,070

(22) Filed: Apr. 7, 2021

(65) Prior Publication Data

US 2021/0259047 A1    Aug. 19, 2021

Related U.S. Application Data

(63) Continuation of application No. PCT/CN2018/109539, filed on Oct. 9, 2018.

(51) Int. Cl.
| | | |
|---|---|---|
| *H04H 20/71* | (2008.01) | |
| *H04W 76/40* | (2018.01) | |
| *H04W 4/08* | (2009.01) | |
| *H04W 80/04* | (2009.01) | |

(52) U.S. Cl.
CPC ............ *H04W 76/40* (2018.02); *H04W 4/08* (2013.01); *H04W 80/04* (2013.01)

(58) Field of Classification Search
CPC ........ H04W 76/40; H04W 80/04; H04W 4/08
USPC .................................................. 370/312, 390
See application file for complete search history.

(56) References Cited

U.S. PATENT DOCUMENTS

| | | | |
|---|---|---|---|
| 2011/0289203 A1 | 11/2011 | Braudes et al. | |
| 2013/0225135 A1 | 8/2013 | Cook et al. | |
| 2018/0192390 A1 | 7/2018 | Li et al. | |
| 2018/0192472 A1* | 7/2018 | Callard | ................ H04W 76/20 |
| 2019/0158408 A1* | 5/2019 | Li | ......................... H04L 45/306 |
| 2019/0261260 A1* | 8/2019 | Dao | ...................... H04W 48/18 |
| 2020/0045753 A1* | 2/2020 | Dao | ...................... H04W 76/10 |
| 2020/0059761 A1* | 2/2020 | Li | ....................... H04L 63/0892 |

(Continued)

FOREIGN PATENT DOCUMENTS

| | | |
|---|---|---|
| CN | 101729526 A | 6/2010 |
| CN | 102394877 A | 3/2012 |
| CN | 105991421 A | 10/2016 |

(Continued)

OTHER PUBLICATIONS

WO, International Search Report, PCT/CN2018/109539, dated Jun. 28, 2019, 22 pages.

(Continued)

*Primary Examiner* — Chuong T Ho
(74) *Attorney, Agent, or Firm* — Bayes PLLC (57) ABSTRACT

An apparatus and a method of performing a group communication are provided. The method performing the group communication of a user equipment (UE) includes transmitting, to at least one group member in a group communication system, at least one data, and transmitting, to a first apparatus in the group communication system, first information in the group communication system. The first information is used to initiate a connection establishment request in the group communication system.

17 Claims, 4 Drawing Sheets

(56) References Cited

U.S. PATENT DOCUMENTS

| | | | | |
|---|---|---|---|---|
| 2020/0351980 A1* | 11/2020 | Talebi Fard | .......... | H04W 68/00 |
| 2020/0351984 A1* | 11/2020 | Talebi Fard | .......... | H04W 80/02 |

FOREIGN PATENT DOCUMENTS

| | | | |
|---|---|---|---|
| CN | 108323245 A | 7/2018 | |
| EP | 3711312 A1 | 9/2020 | |
| EP | 3735785 A1 | 11/2020 | |
| EP | 3753298 A1 | 12/2020 | |
| WO | 2019136128 A1 | 7/2019 | |

OTHER PUBLICATIONS

PCT Written Opinion of the International Searching Authority issued in corresponding International Application No. PCT/CN2018/109539, dated Jun. 28, 2019, 4 pages.

"3rd Generation Partnership Project; Technical Specification Group Services and System Aspects; Feasibility Study on LAN Support in 5G (Release 16)", 3GPP TR 22.821 V16.1.0 (Jun. 2018), 52 pages.

Supplementary European Search Report issued in corresponding European Application No. EP 18 93 6406, dated Sep. 20, 2021, 9 pages.

"Miscellaneous editorial corrections (capitalization, messages procedures etc", 3GPP TSG-SA2 Meeting #125, S2-181471, Gothenburg, Sweden, Jan. 21-26, 2018, 75 pages.

3rd Generation Partnership Project; Technical Specification Group Services and System Aspects; Study on Cellular IoT support and evolution for the 5G System (Release 16), 3GPP TR 23.724 V1.0.0 (Sep. 2018), 241 pages.

First Office action issued in corresponding Chinese Application No. 202110438103.6, dated Jan. 19, 2022, 19 pages.

First Office action issued in corresponding India Application No. 202117016699, dated Mar. 15, 2022, 7 pages.

First Office action issued in corresponding European Application No. 18936406.0, dated Mar. 28, 2022, 5 pages.

"Miscellaneous editorial corrections (capitalization, messages, procedures etc.)", Source to WG: MediaTek Inc., Nokia, Nokia Shanghai Bell, 3GPP TSG-SA2 Meeting #125, S2-180365, Gothenburg, Sweden, Jan. 21-26, 2018, 76 pages.

"3rd Generation Partnership Project; Technical Specification Group Services and System Aspects; Study on 5GS Enhanced support of Vertical and LAN Services (Release 16)", 3GPP TR 23.734 V0.2.0 (Sep. 2018), 39 pages.

\* cited by examiner

APPARATUS AND METHOD OF PERFORMING A GROUP COMMUNICATION

CROSS-REFERENCE TO RELATED APPLICATIONS

This application is a continuation application of International Application No. PCT/CN2018/109539, filed on Oct. 9, 2018, the entire contents of which are incorporated herein by reference.

BACKGROUND

The present disclosure relates to the field of communication systems, and more particularly, to an apparatus and a method of performing a group communication.

In long term evolution (LTE) and new radio (NR) systems, a public network system, such as, a public land network based on public land mobile network (PLMN), is usually deployed. However, in some scenarios, such as offices, homes, and factories, in order to be more effective and securely managed, local users or administrators usually lay out a local network. Members in a local network group can communicate in a point-to-point manner or point-to-multipoint communication.

Therefore, there is a need for an apparatus and a method of performing a group communication.

SUMMARY

An object of the present disclosure is to propose an apparatus and a method of performing a group communication capable of providing a good group communication performance and high reliability.

In a first aspect of the present disclosure, a user equipment (UE) in a group communication system is provided. The UE includes a memory, a transceiver, and a processor coupled to the memory and the transceiver. The processor is configured to control the transceiver to transmit, to at least one group member in the group communication system, at least one data; and initiate, to a first apparatus, a connection establishment request in the group communication system.

In a second aspect of the present disclosure, a method of performing a group communication of a user equipment (UE) is provided. The method includes transmitting, to at least one group member in a group communication system, at least one data, and initiating, to a first apparatus in the group communication system, a connection establishment request session establishment request in the group communication system.

In a third aspect of the present disclosure, a session management function (SMF) node in a group communication system is provided. The SMF node includes a memory, a transceiver, and a processor coupled to the memory and the transceiver. The processor is configured to control the transceiver to receive a connection establishment request from a user equipment (UE) in the group communication system, and select an apparatus as a serving apparatus for the group communication system based on the connection session establishment request.

In a fourth aspect of the present disclosure, a method of performing a group communication of a session management function (SMF) node is provided. The method includes receiving a connection session establishment request from a user equipment (UE) in the group communication system, and selecting an apparatus as a serving apparatus for the group communication system based on the connection session establishment request.

According to an embodiment, a non-transitory machine-readable storage medium stores thereon instructions that, when executed by a computer, cause the computer to perform the above method.

According to an embodiment, a terminal device includes a processor and a memory configured to store a computer program. The processor is configured to execute the computer program stored in the memory to perform the above method.

According to an embodiment, a network node includes a processor and a memory configured to store a computer program. The processor is configured to execute the computer program stored in the memory to perform the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
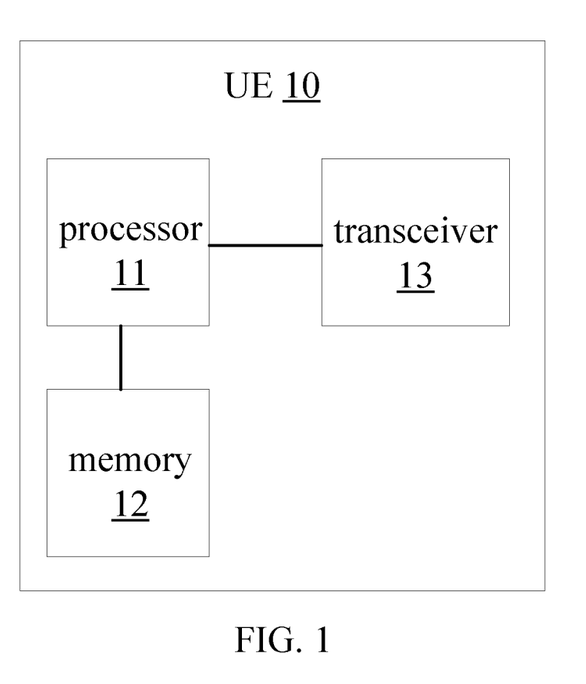
FIG. 1 is a structural schematic diagram of a user equipment (UE) in a group communication system according to an embodiment of the present disclosure.
Figure 2:
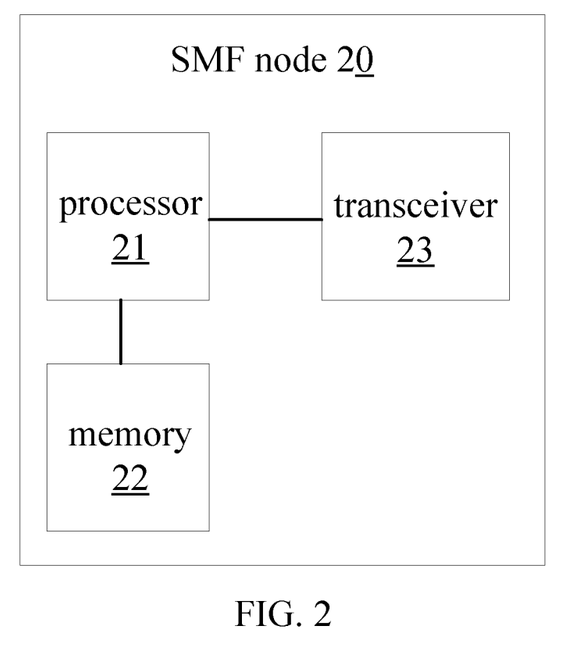
FIG. 2 is a structural schematic diagram of a session management function (SMF) node in a group communication system according to an embodiment of the present disclosure.

FIGS. 1 and 2 illustrate that, in some embodiments, structural schematic diagrams of a user equipment (UE) 10 and a session management function (SMF) node 20 in a group communication system are provided. The UE 10 may include a processor 11, a memory 12 and a transceiver 13. The processor 11 may be configured to implement proposed functions, procedures and/or methods described in this description. Layers of the radio interface protocol may be implemented in the processor 11. The memory 12 is operatively coupled with the processor 11 and stores a variety of information to operate the processor 11. The transceiver 13 is operatively coupled with the processor 11, and transmits and/or receives a radio signal.

The BS 20 may include a processor 21, a memory 22 and a transceiver 23. The processor 21 may be configured to implement proposed functions, procedures and/or methods described in this description. Layers of radio interface protocol may be implemented in the processor 21. The memory 22 is operatively coupled with the processor 21 and stores a variety of information to operate the processor 21. The transceiver 23 is operatively coupled with the processor 21, and transmits and/or receives a radio signal.

The processors 11 and 21 may include application-specific integrated circuit (ASIC), other chipset, logic circuit and/or data processing device. The memories 12 and 22 may include read-only memory (ROM), random access memory (RAM), flash memory, memory card, storage medium and/or other storage device. The transceivers 13 and 23 may include baseband circuitry to process radio frequency signals. When the embodiments are implemented in software, the techniques described herein can be implemented with modules (e.g., procedures, functions, and so on) that perform the functions described herein. The modules can be stored in the memories 12 and 22 and executed by the processors 11 and 21. The memories 12 and 22 can be implemented within the processors 11 and 21 or external to the processors 11 and 21 in which case those can be communicatively coupled to the processors 11 and 21 via various means as is known in the art.

In some embodiments, the processor 11 is configured to control the transceiver 13 to transmit, to at least one group member in the group communication system, at least one data, and the processor 11 is configured to initiate, to a session management function (SMF) node, a group specific packet data network (PDU) session establishment request in the group communication system.

In some embodiments, the processor 21 is configured to control the transceiver 23 to receive a group specific packet data network (PDU) session establishment request from the UE 10 in the group communication system, and the processor 21 is configured to select a first user plane function (UPF) node as a serving UPF for the group communication system based on the PDU session establishment request.

Figure 3:
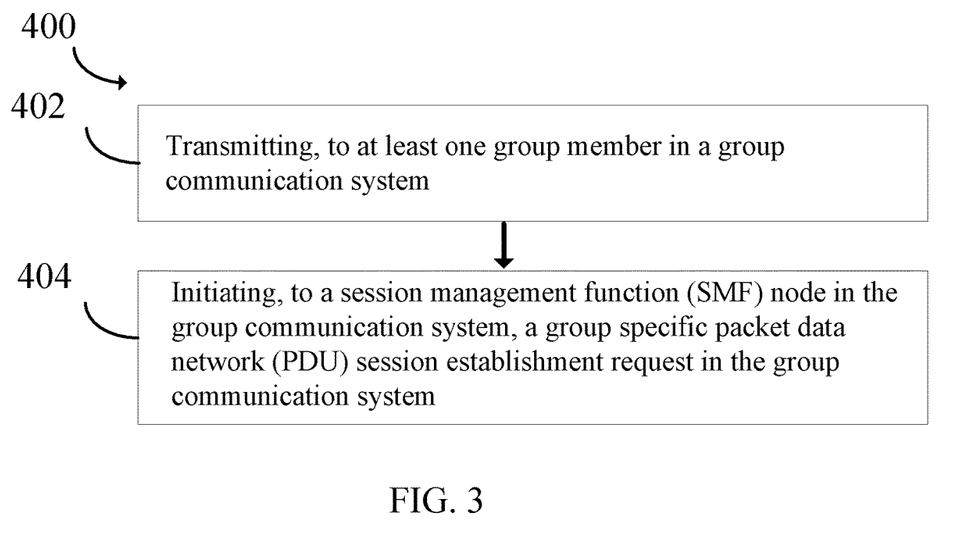
FIG. 3 is a flowchart illustrating a method of performing a group communication of a user equipment (UE) according to an embodiment of the present disclosure.

FIG. 3 illustrates a method of performing a group communication of the UE 10 according to an embodiment of the present disclosure.

The method 400 includes: at block 402, transmitting, to at least one group member in a group communication system, at least one data, and at block 404, initiating, to a session management function (SMF) node 20 in the group communication system, a group specific packet data network (PDU) session establishment request in the group communication system.

Figure 4:
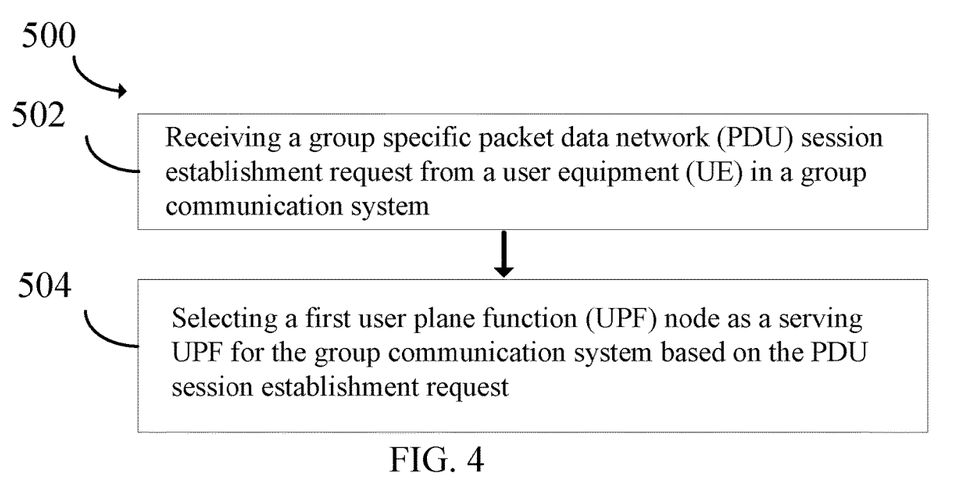
FIG. 4 is a flowchart illustrating a method of performing a group communication of a session management function (SMF) node according to an embodiment of the present disclosure.

FIG. 4 illustrates a method 500 of performing a group communication of the SMF node 20 according to an embodiment of the present disclosure.

The method 500 includes: at block 502, receiving a group specific packet data network (PDU) session establishment request from a user equipment (UE) 10 in a group communication system, and at block 504, and selecting a first user plane function (UPF) node as a serving UPF for the group communication system based on the PDU session establishment request.

Figure 5:
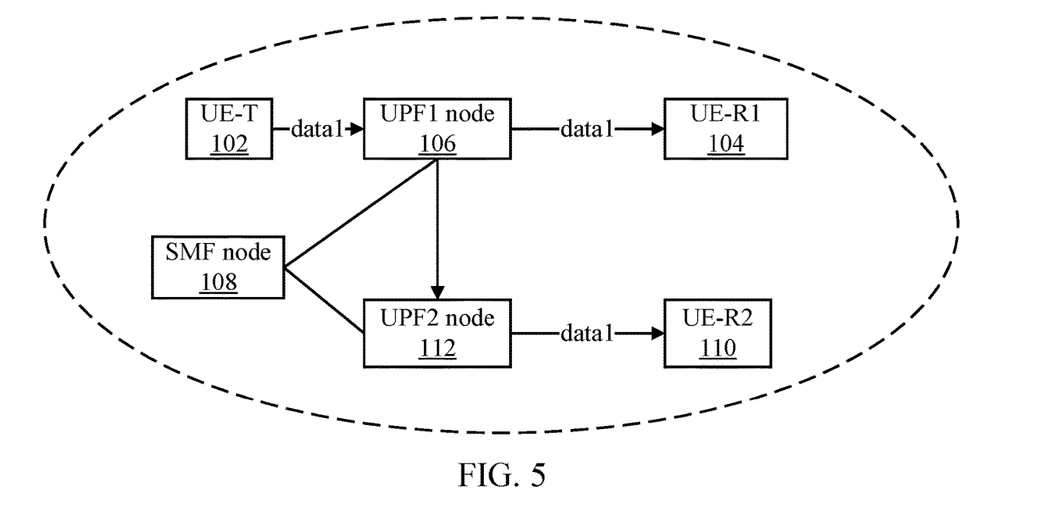
FIG. 5 is a schematic diagram of exemplary illustration of point-to-multipoint communication user plane topologies according to an embodiment of the present disclosure.
Figure 6:
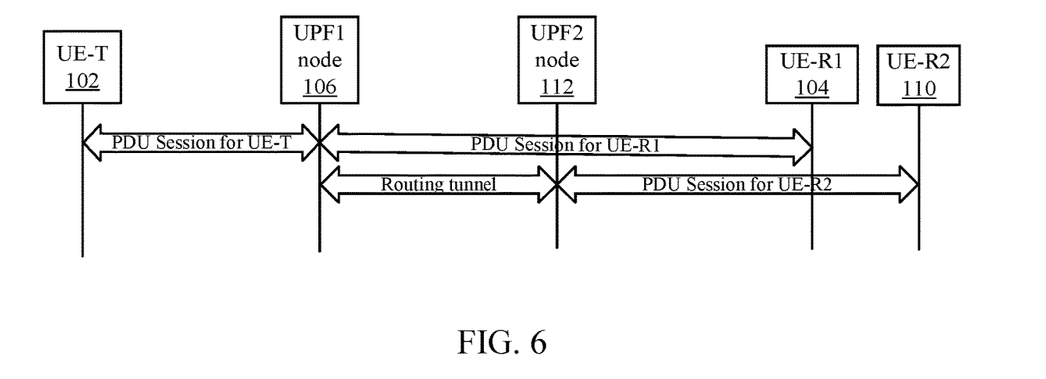
FIG. 6 is a schematic diagram of exemplary illustration of point-to-multipoint communication group PDU session according to an embodiment of the present disclosure.
Figure 7:
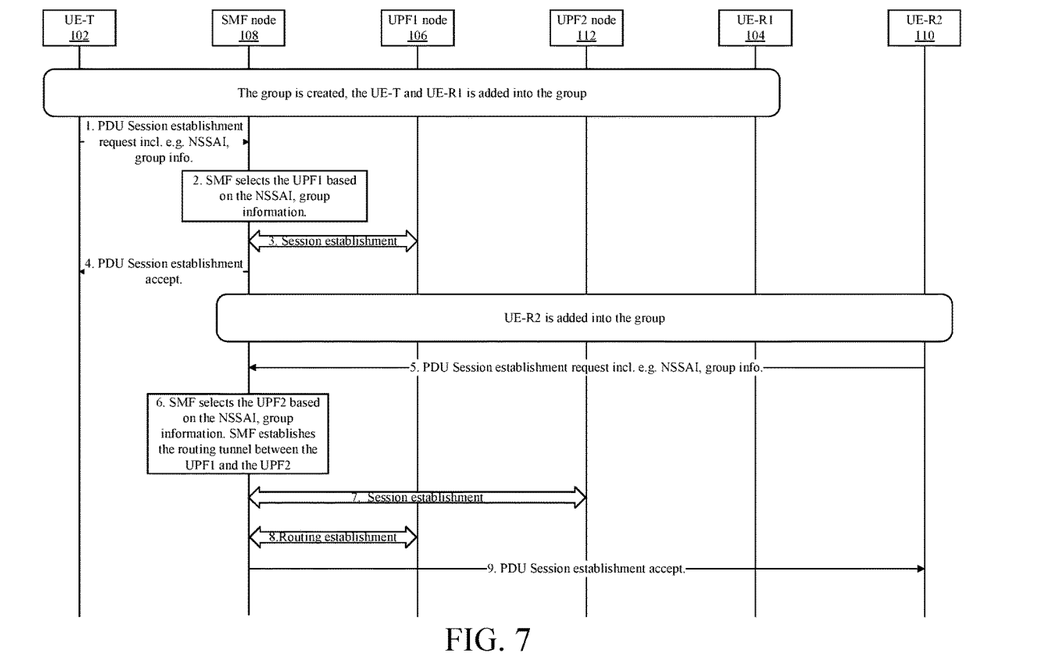
FIG. 7 is a schematic diagram of exemplary illustration of point-to-multipoint communication PDU session establishment procedure according to an embodiment of the present disclosure.

FIGS. 5 to 7 illustrate that, in some embodiments, point-to-multipoint group communication is provided. in some embodiments, in order to support one to many communications in one group, group specific packet data network (PDU) session is introduced. Fifth generation system (5GS) can support a group specific PDU session establishment, release, modify along with the group/group member addition or removal. It is understood that session management function (SMF) node 108 is responsible for group specific PDU session management. Different members in the group can be served by same user plane function (UPF) node such as a UPF1 node 106 or different UPF nodes such as the UPF1 node 106 and a UPF2 node 112. In one group, scenario can be illustrated in FIGS. 5 to 7. UE-T 102 is a transmitter UE while UE-R1 104 and UE-R2 110 are the receiver UEs, in which UE-T 102 and UE-R1 104 are served by same UPF1 node 106, UE-R2 110 are served by UPF2 node 112. Data from UE-T 102 is transmitted within fifth generation system (5GS) and routed by UPF nodes such as UPF1 node 106 and UPF2 node 112.

The group specific PDU session is terminated at the member and the serving UPF. When a group is established by one application function (AF) or one UE, a group specific PDU session is established for each group member who is added into the group with the group creation. The SMF node 108 is enhanced to support the group-based PDU session management function, including group-based PDU session establishment. After the group creation, when a group member is added into the group, the group specific PDU session is established for a new joined member. The SMF node 108 is responsible for establishing a routing tunnel between the UPF node serving the new joined member and the UPF nodes serving the authorized transmitting members.

In some embodiments, this procedure describes the one to many communications PDU session establishment procedure. It is understood that one group is managed by a same SMF. The group creation and group member joining procedure is based on other solution and not mentioned in this solution. This embodiment is an example, and the present disclosure is not limited thereto.

At block 1, when the group is created, and group member UE-T 102 and UE-R1 104 are added into the group, and UE-T 102 is authorized to send one to many data to the member in the group. UE-T 102 initiates group specific PDU session establishment request, including the request S-NSSAI, group information, etc.

In details, the group information could be e.g., group index, group specific data network name (DNN) information, or group specific application server information.

At block 2, after receiving the request from UE-T 102, SMF node 108 selects the UPF1 node 106 as the serving UPF for the specific group based on the S-NSSAI information and group information.

At block 3, SMF node 108 sends session establishment request to UPF1 node 106, including the allocated core network (CN) tunnel information on N3 interface. UPF1 node 106 acknowledges by sending session establishment response message.

At block 4, SMF node 108 sends PDU session accept to the UE-T 102. In case of PDU session type IPv4 or IPv6 or IPv4v6, the SMF node 108 allocates an IP address/prefix for the PDU Session, and the address/prefix is for the group specific.

Alternatively, if the group shares the PDU session with other groups, a group specific address is also allocated to at least one UE of other groups.

At block 5, when UE-R2 110 is added into the group, UE-R2 110 initiates PDU session establishment request to the SMF node 108, including S-NSSAI information and group information.

At block 6, SMF node 108 selects UPF2 node 112 as the serving UPF for UE-R2 110, and determines to establish a routing tunnel between UPF1 node 106 serving UE-T 102 and the UPF2 node 112.

At block 7, SMF node 108 sends session establishment request to UPF2 node 112, including the allocated CN tunnel information, the CN tunnel information includes the UPF2 address of the tunnel between UPF1 node 106 and UPF2 node 112 and the UPF2 address of N3 tunnel. UPF2 node 112 acknowledges by sending session establishment response message.

At block 8, SMF node 108 establishes routing tunnel between UPF1 node 106 and UPF2 node 112, and provides the UPF2 address of the tunnel between UPF1 node 106 and UPF2 node 112 to UPF1 node 106. Also, SMF node 108 provides the association information of this routing tunnel and PDU session for UE-T 102.

At block 9, SMF node 108 sends PDU session accept to UE-R2 110. In case of PDU session type IPv4 or IPv6 or IPv4v6, the SMF node 108 allocates an IP address/prefix for the PDU session, and the address/prefix is the group specific for UE-R2 110. If there is existing PDU session for another group for UE-R2 110, the existing PDU Session can be re-used for a newly joined group, i.e., multiple groups can share one PDU session for the receiving member in the group.

Further, UE-T 102 sends the group data to the UPF1 node 106, UPF1 node determines the receiving UE-R1 104, UE-R2 110 according to the routing association information provided at block 8 and routes the data to the tunnel corresponding to UE-R1 104 and UE-R2 110 respectively.

If PDU session is shared by multiple groups, UPF 1 node 106 determines the receiving UE-R1 104, UE-R2 110 according to the group specific address information to obtain the group information.

Figure 8:
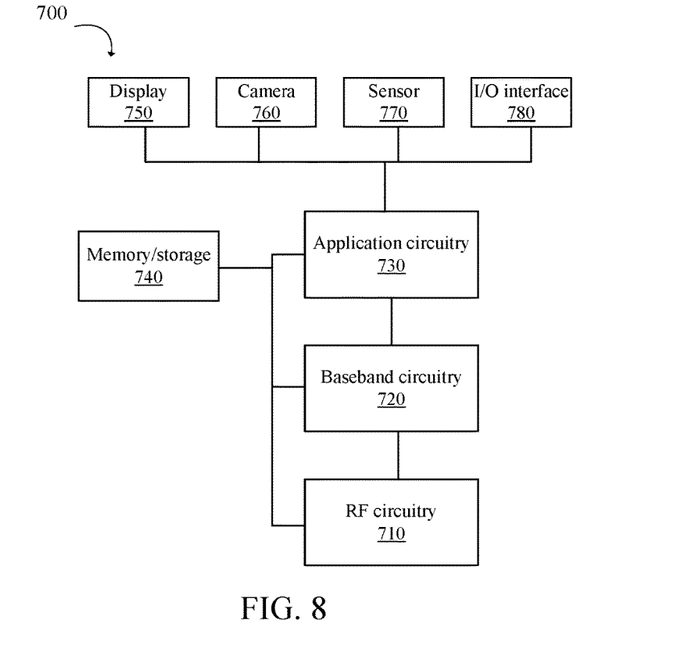
FIG. 8 is a block diagram of a system for wireless communication according to an embodiment of the present disclosure.

FIG. 8 is a block diagram of a system 700 for wireless communication according to an embodiment of the present disclosure. Embodiments described herein may be implemented into the system using any suitably configured hardware and/or software. FIG. 8 illustrates, for one embodiment, an example system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

In the embodiment of the present disclosure, the apparatus and the method of performing a group communication provide a good group communication performance and high reliability. The embodiment of the present disclosure is a combination of techniques/processes that can be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

It is understood that the present disclosure is not limited to the disclosed embodiments, but is intended to cover various arrangements made without departing from the scope of the broadest interpretation of the appended claims.

What is claimed is:

1. A user equipment (UE) in a group communication system, comprising: a memory; a transceiver; and a processor coupled to the memory and the transceiver, wherein the processor is configured to: control the transceiver to transmit, to a first apparatus, first information in the group communication system, wherein the first information comprises a group specific packet data network (PDU) session establishment request which is used to initiate a group specific PDU session in the group communication system, wherein the group specific PDU session establishment request comprises group information, and the group information is group specific data network name (DNN) information;

wherein the group specific PDU session is terminated at a member in the group communication system and a serving user plane function (UPF).

2. The UE of claim 1, wherein the first apparatus is a session management function (SMF) node.

3. The UE of claim 2, wherein the transceiver is configured to receive a PDU session accept from the (SMF) node.

4. The UE of claim 3, wherein when a PDU session type is an internet protocol version four (IPv4), IPv6, or IPv4v6, the processor is configured to receive at least one of an IP address or prefix of a PDU session from the SMF node, and the at least one of the IP address or the prefix of the PDU session is used in the group communication system.

5. The UE of claim 4, wherein if the group communication system shares the PDU session with at least another group communication system, the at least one of the IP address or the prefix of the PDU session is allocated to at least another UE of the at least another group communication system.

6. The UE of claim 2, wherein all PDU sessions for the group communication system are managed by the SMF.

7. A method performing a group communication of a user equipment (UE), comprising: transmitting, to a first apparatus in a group communication system, first information in the group communication system, wherein the first information comprises a group specific packet data network (PDU) session establishment request which is used to initiate a group specific PDU session in the group communication system, wherein the group specific PDU session establishment request comprises group information, and rho group information is group specific data network name (DNN) information;

wherein the group specific PDU session is terminated at a member in the group communication system and a serving user plane function (UPF).

8. The method of claim 7, wherein the first apparatus is a session management function (SMF) node.

9. The method of claim 8, further comprising receiving a PDU session accept from the SMF node.

10. The method of claim 9, wherein when a PDU session type is an internet protocol version four (IPv4), IPv6, or IPv4v6, the method further comprises receiving at least one of an IP address or prefix of a PDU session from the SMF node, and the at least one of the IP address or the prefix of the PDU session is used in the group communication system.

11. The method of claim 10, wherein if the group communication system shares the PDU session with at least another group communication system, the at least one of the IP address or the prefix of the PDU session is allocated to at least another UE of the at least another group communication system.

12. The method of claim 8, wherein all PDU sessions for the group communication system are managed by the SMF.

13. A network node in a group communication system, comprising: a memory; a transceiver; and a processor coupled to the memory and the transceiver, wherein the processor is configured to: control the transceiver to receive first information from a user equipment (UE) in the group communication system, wherein the first information comprises a group specific packet data network (PDU) session establishment request which is used to initiate a group specific PDU session in the group communication system; and select an apparatus as a serving apparatus for the group communication system based on the session establishment request, wherein the group specific PDU session establishment request comprises group information, and the group information is group specific data network name (DNN) information;

wherein the group specific PDU session is terminated at a member in the group communication system and a serving user plane function (UPF).

14. The network node of claim 13, wherein the apparatus is the user plane function (UPF) node.

15. The network node of claim 14, wherein the transceiver is configured to transmit, to the apparatus, a session establishment request, and the transceiver is configured to receive a session establishment response message from the apparatus.

16. The network node of claim 15, wherein the session establishment request comprises an allocated core network (CN) tunnel information on an interface.

17. The network node of claim 14, wherein all PDU sessions for the group communication system are managed by a SMF.

* * * * *